Figure 1:
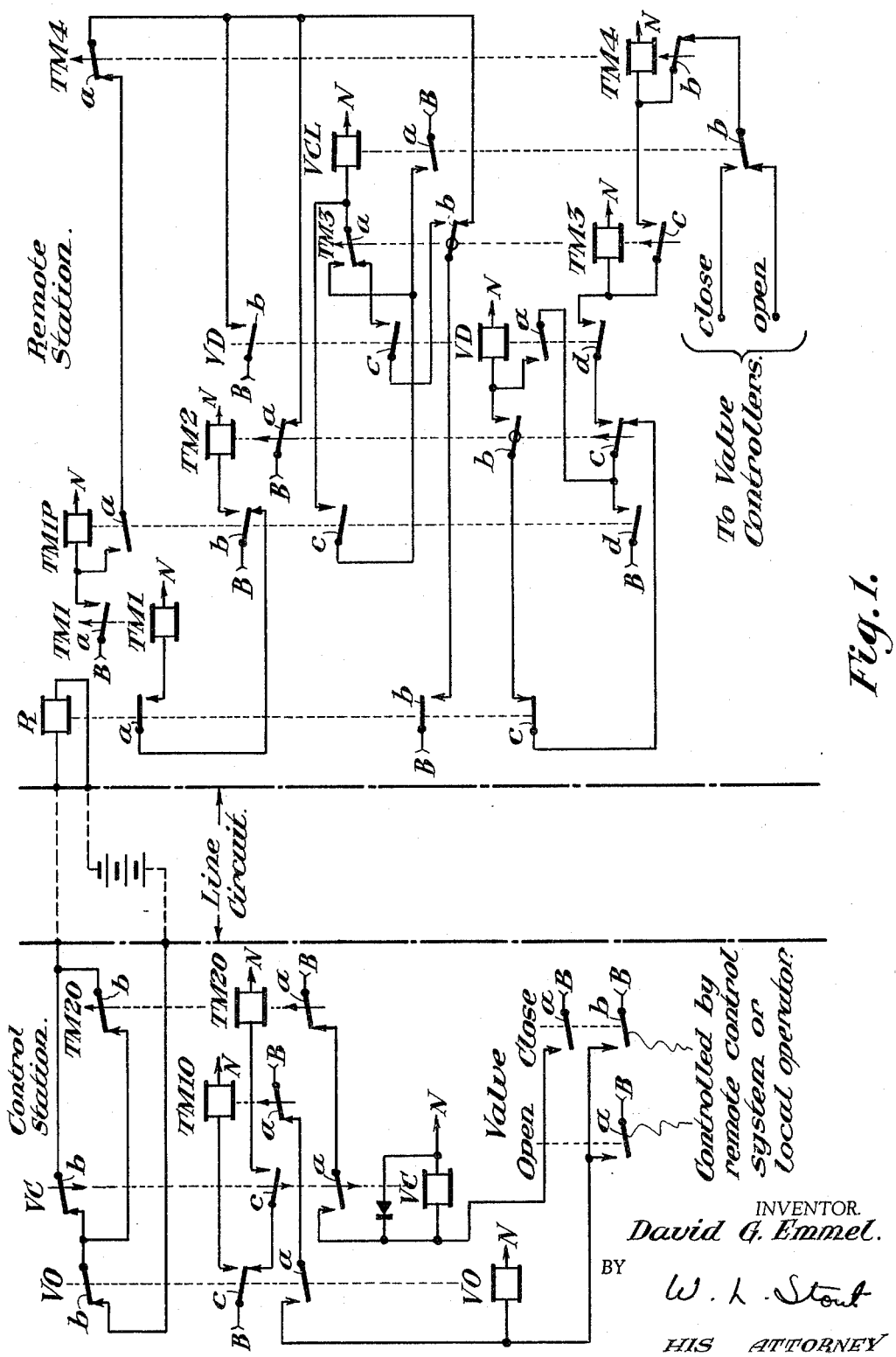

Nov. 29, 1966  D. G. EMMEL  3,289,166
REMOTE FUNCTION CONTROL BY DISCRETE PULSE PATTERNS
Filed July 26, 1962  2 Sheets-Sheet 1

INVENTOR.
David G. Emmel.
BY
W. L. Stout
HIS ATTORNEY 3,289,166
REMOTE FUNCTION CONTROL BY DISCRETE
PULSE PATTERNS
David G. Emmel, Castle Shannon, Pa., assignor to Westinghouse Air Brake Company, Wilmerding, Pa., a corporation of Pennsylvania
Filed July 26, 1962, Ser. No. 212,584
5 Claims. (Cl. 340—163)

My invention pertains to remote function control by discrete pulse patterns. More particularly, my invention pertains to a circuit arrangement for the control of a single device at a remote location over a line circuit from a local station by selected patterns of pulses specifically timed to eliminate false pulses induced into the line circuit by natural and other extraneous phenomena.

In the majority of remote control system installations, the apparatus at each remote station is of a standard type similar to the apparatus at each of the other stations. Each set of apparatus provides controls for a preselected number of functions at the particular station. The use of such standard apparatus reduces the cost of these control installations since only a selected percentage of maintenance and standby apparatus need be kept in stock. Frequently in such systems, a single device which is to be controlled is located far beyond the final remotely controlled station of this system. For example, in pipe line control systems, a discharge valve, with no other associated apparatus, may be located at the end of the pipe line, which is a considerable distance beyond the final station location at which pumps and valves are controlled by the remote control system. Under such conditions, it is not feasible or economic to provide a complete remote station apparatus to control this single function. Other factors which enter into the considerations are the long distance over which some form of communication channel must be provided and the matter of infrequent control of discharge valve in the normal operation of the system. Also, under normal operations, an indication of the position of this discharge valve is not necessary since its position or condition will be reflected back though the pipe line to the location of the last station at which the pumps are located. Yet this discharge valve must be correctly controlled with a minimum possibility of error in the transmission of the control functions and their reception at that location. It is possible and is well known to control such single devices having only two positions over a single line circuit by the polarity of the energy applied to that line circuit or by transmitting pulses normally having selected polarity for different controls. However, fault conditions must be avoided and it is known that pulses induced into such a line circuit will have characteristics which may interfere with the correct control. Normally, it is possible to determine with reasonable accuracy for the circuit to be used the characteristics which possible induced fault pulses will have. Under such circumstances, if operation of the valve or other device by fault conditions can be avoided, it becomes possible to use some form of such control over the single line circuit. The control system therefor must utilize a distinct pulse pattern not likely duplicated by the induced pulses or other phenomena.

Accordingly, it is an object of my invention to provide a remote control arrangement utilizing pulses having a discrete pattern of preselected lengths to transmit a control function to a remote location.

Another object of my invention is a circuit arrangement for remotely controlling a single function over a single line circuit using pulses having preselected time lengths chosen to differ from pulses induced into such line circuit by any natural phenomena.

It is also an object of my invention to provide a remote control arrangement for a single function in which the remotely located apparatus monitors the line circuit to detect the transmitted pulses only at preselected time intervals, thereby eliminating the effects of incorrect pulses which result from causes other than the regular transmitting apparatus.

A further object of my invention is a pulse type remote control arrangement transmitting pulses of a distinct pattern of preselected lengths over a line circuit, the pulses being effective at the remote location only if the pulse terminations occur within discrete time periods established by the station line monitoring apparatus.

Still another object of my invention is to provide remote control for a single, two position function over a single line circuit by the use of the time pulses effective to control the function only if pulse change is detected by the station line monitoring apparatus within preselected time intervals.

Other objects, features, and advantages of my invention will become apparent from the following description when taken in connection with the accompanying drawings.

I shall now describe generally and then in more detail the apparatus and operation of the arrangement of my invention, referring from time to time to the accompanying drawings in which:

FIG. 1 is a diagrammatic circuit arrangement using standard symbols to illustrate one form of a control system arrangement embodying my invention.

Figure 2:
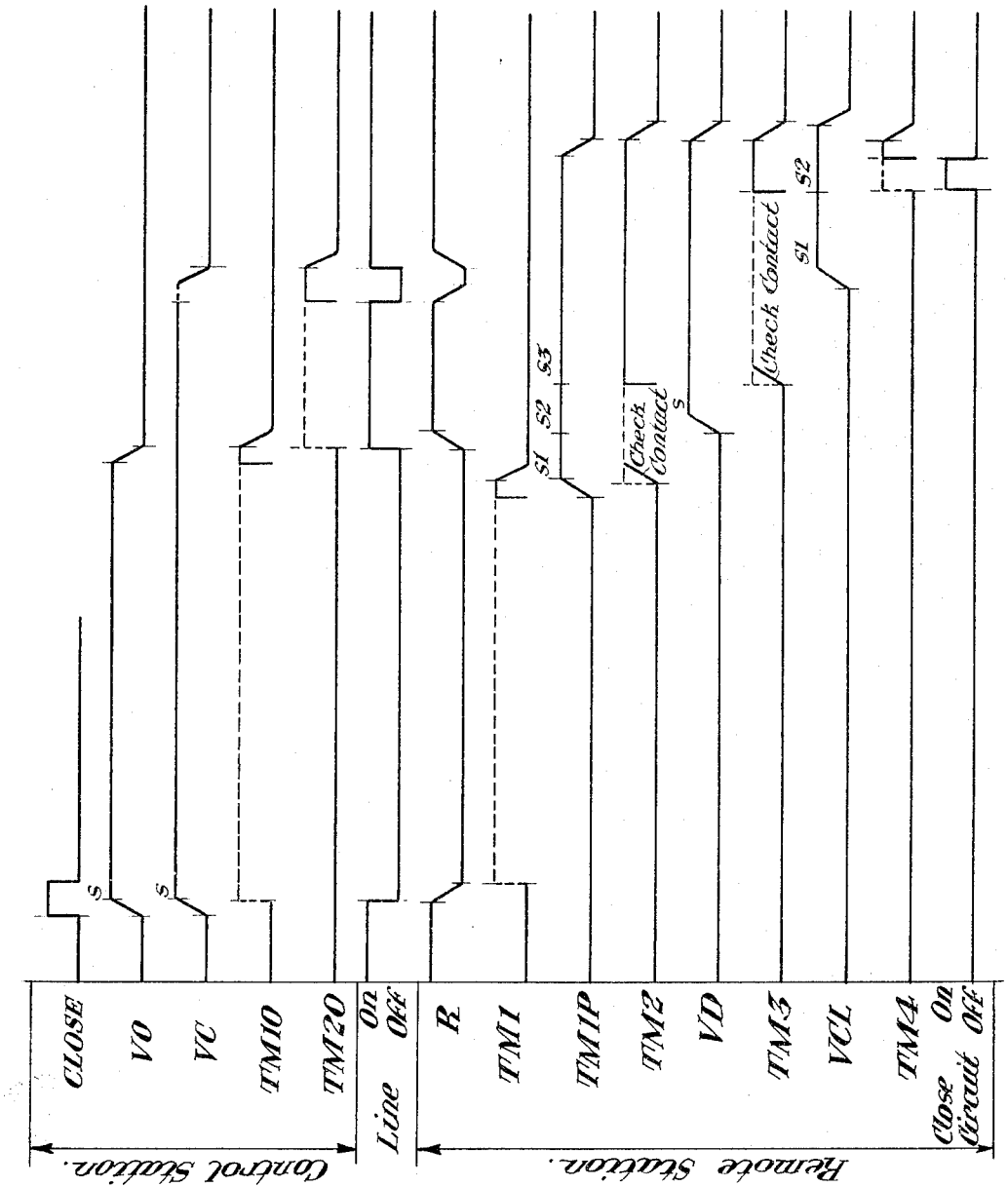

Illustrated in FIG. 2 is a timing chart of the relay operations of the circuit shown in FIG. 1 under one assumed condition of control function transmission.

In each of the drawings, similar reference characters refer to similar parts of the apparatus.

In practicing my invention, I provide a line circuit arrangement between a local or control station location and the location of the device or function to be remotely controlled, hereinafter referred to as the remote station. The local or control station may be the final station location of a normal remote control system controlled from a central office location, receiving control functions from the central office and transmitting indications thereto. The local station may also be the headquarters of the operator responsible for the remote control of the distant function in which case the selection of the desired condition is accomplished at the local station location. The line circuit arrangement includes a line relay at the remote location which is energized or deenergized in accordance with the condition of the line circuit. This line circuit itself may be and normally is a leased commercial circuit, preferably of the telegraph type, and need not necessarily be a physical circuit between the two locations. At the local station, I provide two function stick relays to receive and store the desired control for the remotely located apparatus, the control function being stored by one or both of these relays in accordance with the desires of the system operator. Also at the local station are two timing relays. The first timing relay is used to establish a first timing period of preselected length, this timing period being established whether the first or the second control condition of the distant apparatus is desired. The second relay is used to establish a second timing period of selected but shorter length which is used during the control of the second condition of the remote apparatus. The control function transmission over the line circuit from the local station is accomplished by a joint control of the line circuit by the function stick relays and the timing relays. The function stick relays are held energized, that is, stick circuits are provided, over contacts of the timing relays. For the first function condition, herein the valve open condition, a single line open period is transmitted from the office location. For the second or valve closed condition, the same initial line open pulse is also transmitted. Under the presently described arrangement, this is followed by a period during which the line circuit is closed, that is, energized. Then follows a relatively short open circuit pulse transmitted from the local station under the control of the second function stick relay and the second timing relay.

At the remote station, the circuit arrangement provided by my invention monitors the line circuit condition, that is, monitors the position of the line relay which is at this location. The circuit apparatus includes timing relays and neutral type relays for purposes of monitoring and detecting the timing periods transmitted from the office and for controlling the function position. A first station timing period is established by a first station timing relay, similar to the first open circuit period transmitted from the local station but of a slightly shorter length. This is followed by a second station timing period which is established with just sufficient length to span the time during which the line circuit is reclosed at the control station. In other words, the second period extends for sufficient interval after the end of the first station timing period to include the time interval in the total cycle during which the line circuit is again energized. If the line is reclosed during this period, indicating that the first open circuit pulse was a valid, transmitted control function pulse, a checking or monitor relay is energized and picks up at the remote station. This action initiates the operation of a third timing relay which establishes a time interval spanning the time during which the second or short line open pulse will be transmitted. During this third station timing period, the position of a line relay is monitored by a circuit arrangement which is completed to energize a valve control relay only if a valid first pulse was previously received and if the short second line open pulse occurs during this time interval. If no such pulse occurs within this third period, the valve control relay remains deenergized or is released. At the end of the third station timing period, the control function received from the local station is passed to the remotely controlled device, herein assumed to be a discharge valve of a pipe line. In addition, a fourth station timing period is initiated which is used to limit the length of the control pulse in accordance with the type of control required by the device. At the end of the fourth station timing period, that is, when the fourth station timing relay picks up, the station apparatus is reset to its normal, at-rest condition, the function control having been passed to the device to initiate or accomplish the desired control. At the control or local station location, the function transmission apparatus for this arrangement resets after the end of the second timing period, that is, after the second line open pulse is or would have been transmitted. Each of the function stick relays are released by this time due to the energization of the corresponding timing relay.

I shall now describe in detail the operation of the system of my invention. It is believed sufficient and most satisfactory to describe the apparatus during a period of operation with only a brief preliminary description of some of the special apparatus used. During this detailed description, I shall refer also to the accompanying drawings, both the circuit diagram and the timing chart. Although specific reference to FIG. 2 of the drawings may often be omitted, continued reference is invited to this timing chart to broaden the operational description.

In the circuit arrangement of FIG. 1, the various timing relays necessary for the operation of the system of my invention are shown using conventional symbols to represent the relay windings. Each of these relays is designated by the reference character TM with a numerical suffix, the single exception being the remote station first timing relay repeater TM1P which is a neutral type relay. Thus at the remote station location at the right of the circuit arrangement, the relays TM1, TM2, TM3, and TM4 are timing relays while at the control or local station ararngement at the left of the drawing, the timing relays are designated by the reference characters TM10 and TM20. In general, the operating characteristics of these relays are such that the relay is energized for a preset period of time before the relay timing contacts are picked up to close front contacts and open the corresponding back contacts. During the timing period, the back contacts remain closed and the front contacts remain open. Such timing contacts of these relays are marked with an upward pointing arrow to designate their slow response. Relays TM2 and TM3, however, each have a set of contacts known as checking contacts which pick up in the usual manner of relay contacts as soon as the relay winding is energized. Such contacts are marked with a small circle superimposed on the movable portion of the contact symbol.

Each location in the arrangement illustrated is provided with a local source of direct current energy for energizing the relay windings during system operation. This local source of direct current energy may be a battery of suitable size and capacity or any other well known device for supplying direct current energy. Since the use of such energy sources is conventional, it is considered unnecessary to show the actual source. Rather, the positive and negative terminals thereof, where connections are made thereto, are designated in the drawings by the reference characters B and N, respectively.

The other relays illustrated in the drawings by conventional symbols are of the neutral type which respond to the energization of the windings by closing front contacts. At the control station, the function stick relays VO and VC are of this type, these relays being used, as will become apparent, to briefly store the control function which is to be transmitted. The winding of relay VC is shunted by a half wave rectifier used as a snub to provide a slight measure of slow release characteristic to this relay, the contacts of relay VC being designated as such by downward pointing arrows. At the remote station, the neutral relays are, in addition to relay TM1P, the line relay R, the valid pulse detection relay VD, and the valve control relay VCL.

By way of explanation of the chart of FIG. 2, it is to be understood that in each horizontal section assigned to a particular relay, as listed in the column of reference characters at the left, the relay is picked up or released as the solid line is in the upper or lower position, respectively, in the horizontal section. During the period of time that a timing relay is energized but has not yet picked up its timing contacts, the condition is designated by a dotted line in the upper position. The solid vertical line occurring at the end of this dotted line indicates the time when the timing relay picks up such contacts to close front contacts and open back contacts. Timing relays provided with checking contacts close such contacts in accordance with the slanted line shown immediately to the right of the point, in the left to right time advance, when the relay winding is initially energized. Where a relay is provided with a stick circuit to hold the winding energized, the time at which such stick circuit is effective is indicated by an $s$ along the solid, upper position line for that relay, with a numerical suffix if the relay is provided with multiple stick circuits solely effective at various times. The horizontal section assigned to the line circuit indicates the time during which the line circuit is energized or deenergized as indicated by the terms "on" and "off," respectively. The lighter weight vertical lines throughout the chart indicate the actions which are related at any particular time as the time line moves from left to right throughout the chart.

The control and remote stations are connected by a line circuit which is normally a leased commercial circuit.

The portion between the station line terminals is shown by conventional dotted lines since this portion is not necessarily or even normally a physical pair. Also, in this intervening portion, a line battery is indicated conventionally by standard symbol, this line battery and the dotted connections being used to assist in an understanding of the operation of the line circuit. In other words, the line battery and dotted conventional connections between the line circuit terminals at each location are the equivalent of a physical line circuit pair between these two stations, the leased circuit under all conditions providing such equivalent operation. Actually, the specific description following will assume such physical connections for simplicity. The circuit arrangement is shown in its normal condition in which the line relay R is energized. Under such at-rest conditions, the line circuit connections may be traced from the lower terminal of the battery over back contact b of relay VO, back contacts b, in multiple, of relays VC and TM20, the winding of relay R, and returning to the upper terminal of the battery. Under the normal at-rest condition of the apparatus, all other relays are deenergized.

It is now assumed that a valve-close function is to be transmitted from the control station shown at the left of FIG. 1 to the remote station location where the discharge valve is located. To initiate the transmission of this control function, the CLOSE contacts shown in the lower left of FIG. 1 must be actuated to their closed position. These contacts, and similarly the single OPEN contact also shown in the same place, may be contacts on a local control lever which is actuated by an operator at the control station in order to initiate the transmission of the control functions for the discharge valve. More often, these sets of contacts are controlled by the appropriate function registry relays of the standard type remote control system of which this location is the last or most distant station from the central control office. Under such a system, the contacts are normally open and close, for a short time only, upon the reception of the desired control function from the central office, the incoming control code actuating the appropriate registry relay. In any event, the closing of CLOSE contacts a and b completes the circuits for energizing relays VC and VO, respectively. Obviously, if the OPEN contact is actuated, relay VO alone will be energized. Under the assumed conditions, when relays VC and VO pick up, the closing of their front contacts a completes a stick circuit for each relay, the circuits further including back contacts a of relays TM20 and TM10, respectively. In addition, the closing of front contact c of relay VO completes the energizing circuit for relay TM10 which starts its preset timing period. Although front contact c of relay VC is also closed, the circuit for relay TM20 is interrupted at back contact c of relay VO.

The opening of back contact b of relay VO interrupts the line circuit connections at this location, causing the deenergization of relay R at the remote station, which relay immediately releases. The closing of back contact a of relay R completes the circuit, otherwise including back contact b of relay TM1P and winding of relay TM1, for energizing this latter timing relay which initiates its preselected timing period. The other contacts of relay R having no effect at the present time since the corresponding circuits are open at other points under the existing conditions.

Relays TM10 and TM1 are now energized and operating through their preset timing periods. As was previously indicated, the selected timing period for relay TM1 is of shorter length than that for relay TM10. As specific examples which have been used in one particular installation, the timing period for relay TM10 may be selected at 27 seconds while the timing period for relay TM1 is chosen at 24 seconds. It is to be understood, of course, that these specific times and such other specific times as will be mentioned hereinafter are by way of example only and the system of my invention is not thereby limited to such timing periods only. When relay TM10 completes its timing period and picks up its contacts, the opening of its back contact a interrupts the stick circuit for relay VO which immediately releases. The closing of back contact b of relay VO recloses the control station line circuit connections which at this time also include only back contact b of relay TM20. When relay VO releases, the opening of its front contact c deenergizes relay TM10 which shortly releases its contact, reference being made to FIG. 2 for these various relay actions. The release of relay TM10 has no effect since relay VO is already released to interrupt its stick circuit connections. Relay TM20 is now energized over back contact c of relay VO and front contact c of relay VC. In the present example, the specific timing for relay TM20 is set at 9 seconds. Relay VC obviously remains energized since its stick circuit remains complete at this time.

At the remote station, relay TM1 completes its timing period and picks up just ahead of the similar action on the part of relay TM10 at the control station. The closing of front contact a of relay TM1 completes the obvious circut for energizing its repeater relay TM1P. This latter relay picks up, closing its front contact a to complete its first stick circuit further including back contact a of relay TM4, back contact b of relay TM3, and back contact b of relay R. A second connection to terminal B in multiple with the last two mentioned contacts in the previous circuit also exists over back contact a of relay TM2. The opening of back contact b of relay TM1P interrupts the circuit for relay TM1 which, thus deenergized, releases. The closing of front contact b of relay TM1P completes the obvious circuit for energizing relay TM2 which, thus energized, begins to run its preselected time period which in the present example is specifically set at 6 seconds. At the present time, the closing of the other contacts of relay TM1P has no immediate effect.

When relay TM2 is energized, it immediately closes its checking contact b. This prepares the circuit for monitoring the line circuit arrangement, specifically relay R, for the reclosing of the line circuit at the control station location. This monitoring circuit is also the energizing circuit for the valid pulse detection relay VD and further includes front contact d of relay TM1P to assure that the first timing period at the remote station has been completed, back contact c of relay TM2 to check that the second timing period has not completed, and front contact c of relay R, this last contact being open at the present time.

Shortly thereafter, relay VO at the office releases to reclose the line circuit so that relay R is reenergized and picks up. The closing of front contact c of relay R completes the previously traced energizing circuit for relay VD which, thus energized, picks up. The energization of relay VD assures the validity of the first control pulse transmitted from the control location, specifically as to its length which was selected to eliminate the possibility of false operation due to extraneous induced pulses. The closing of front contact a of relay VD completes a stick circuit for this relay further including front contact d of relay TM1P. The closing of front contact b of relay VD completes the third stick circuit for relay TM1P. The first stick circuit for this latter relay is now open at back contact b of relay R although the second stick circuit including back contact a of relay TM2 is still effective but will shortly be interrupted.

Relay TM2 shortly completes its timing period and picks up its other contacts, specifically contacts a and c. At this time at the remote station the total elapsed time since the initial deenergization of relay R, in the specific example quoted, is 30 seconds plus the pickup time of repeater relay TM1P. Back contact a of relay TM2 interrupts the second stick circuit for relay TM1P at this time, leaving only the third stick circuit over front contact b of relay VD effective. The closing of front contact c of relay TM2 completes the energizing circuit for relay TM3. The circuit further includes front contact d of relay TM1P and front contact d of relay VD so that the operation of relay TM3 cannot be initiated unless the transmission of the first control pulse was proper. Relay TM3 immediately picks up its contact b and initiates the timing period for its other contacts, this specific period in the present example being set at 12 seconds. The closing of front contact b of relay TM3 prepares a second monitoring circuit for detecting if the line circuit is again opened. This second monitoring circuit is also the energizing circuit for the valve control relay VCL, the circuit further including back contact a of relay TM3 to check that the third timing period has not elapsed, front contact c of relay VD to check the validity of the initial pulse from the control location, and back contact b of relay R, this last contact being open at the present time with the line circuit energized.

Returning to the control station, relay TM20 completes its timing period and picks up, the elapsed time in the specific example herein being 36 seconds plus the release time of relay VO. Inspection of the chart of FIG. 2 will correlate this action with the existing condition at the remote station. Back contact a of relay TM20 interrupts the stick circuit for relay VC which is thus deenergized and shortly releases. As previously mentioned, the half wave rectifier snub in multiple with the winding of relay VC provides a short slow release period for this relay as indicated in the timing chart of FIG. 2. Thus, with back contact b of relay TM20 now open and back contact b of relay VC held open for a short period, the line circuit is interrupted at this location and relay R at the remote station is deenergized and releases. However, relay VC releases shortly thereafter, reclosing the line circuit at its back contact b. Reference is made to FIG. 2 for an illustration of the line pulsing under these conditions. The release of relay VC to open its front contact c deenergizes relay TM20, whose release has no effect on the operation at this time.

At the remote location, when relay R releases during this short open circuit pulse of the line circuit, it closes its back contact b to complete the second monitoring circuit, previously traced, energizing relay VCL which picks up. The closing of front contact a of relay VCL completes a stick circuit for this relay which initially includes front contact c of relay TM1P. Relay VCL is thus held energized when its energizing circuit is shortly interrupted by the pickup of relay R as the line circuit is reenergized at the end of the short open period. It is to be noted that the other contacts of relay R have no effect on the system operation at this time.

A short time thereafter, relay TM3 completes its timing period, the elapsed time in the specific example now being approximately 42 seconds from the beginning of the operation. The closing of front contact a of relay TM3 completes the second stick circuit for relay VCL. The closing of front contact c of relay TM3 completes a function control circuit which extends from terminal B over front contact d of relay TM1P, front contact c of relay TH2, front contact d of relay VD, front contact c of relay TM3, back contact b of relay TM4, and front contact b of relay VCL to the "close" terminal, from whence a circuit exists to the valve controller which actuates the closing of the discharge valve. It should be noted that, if back contact b of relay VCL had been closed, the function control circuit would have completed to the "open" terminal of the controller equipment.

Relay TH4 is also energized at this time, the circuit branching from the last traced circuit after front contact c of relay TM3 and extending through the winding of relay TM4 to terminal N. This last timing relay is normally assigned to a very short period which in the specific example is two seconds. When relay TM4 completes this timing period and picks up, the opening of its back contact b interrupts the function control circuit previously traced. In the one specific form of the system embodying my invention, only a two second pulse of energy is needed to operate the valve controllers to initiate the operation of the assumed discharge valve. Such short pulse periods for the control of various devices is common in pipe line control circuits. It is obvious that the function control circuits may be allowed to exist and supply energy for as long a period as is necessary or desired.

The opening of front contact a of relay TM4 initiates the reset action of the remote station apparatus. Referring to FIG. 2 for an illustration, the immediate effect of the opening of back contact a of relay TM4 is to deenergize relay TM1P which immediately releases. When relay TM1P releases, various circuits are interrupted as follows: front contact b of relay TM1P deenergizes relay TM2 which releases, front contact c of relay TM1P is bypassed and has no effect, the opening of front contact d of relay TM1P deenergizes relay VD by interrupting its stick circuit and this latter relay releases. The opening of front contact d of relay TM1P also interrupts the circuits for relays TM3 and TM4 which likewise release at this time. The release of relay TM3 opens its front contact a to interrupt the stick circuit for relay VCL which, thus deenergized, releases to complete the reset action at this remote location. It is to be noted that the reset action at the control location was completed when relays VC and TM20 release. Thus the release of relay VCL at the remote station completes the cycle of operation for controlling the valve controllers of the discharge valve at the remote location.

If the OPEN contact at the control station is operated to initiate the action, only relay VO is energized, as previously explained. When relay TM10 completes its timing period, it picks up to deenergize relay VO, also as previously explained. Since front contact c of relay VC is open, relay TM20 is not energized at this time. Thus, although back contact b of relay VO interrupts the line circuit for the timing period of relay TM10, no short open period of the line circuit occurs at the later time in the cycle, since relays VC and TM20 do not operate at all. Thus, at the remote station, relay R does not again release, once it is reenergized, and the circuit for relay VCL is never completed. However, the other remote station apparatus operates as before. When relay TM3 closes its front contact c at the end of its timing period, the circuit is complete through the "open" terminal to actuate the opening of the discharge valve.

It is obvious that, if the line pulses as received at the remote station do not match the timing periods at this station, no control function can be transmitted and received. Since relay VD does not pick up, no circuit exists for relays TM3, TM4, and the valve controllers. Also, there can be no circuit completed for relay VCL to detect the second or short open pulse. If a short, line open fault pulse occurs, that is, shorter than that actuated by timing relay TM10, relay R is reenergized prior to the completion of the timing period of relay TM1. This latter relay, thus deenergized by the opening of back contact a of relay R, resets its contacts to their initial condition in which the complete timing period must be run in order for the relay to pick up. If, after a normal long open pulse period, a short open period as a result of a fault occurs, such a pulse must occur during the relatively short timing period of relay TM3 in order to be effective. The timing of relay TM3 is adjusted to be as short as possible, consistent with relay operation, to keep within the line circuit characteristics previously decided so that it may properly detect or establish the monitoring circuit. Also, the timing period of relay TM2 is kept as short as possible in order to eliminate detection of practically all line reclosures except a valid one occurring during the proper time span. The circuit for relay VD is complete only when relay R picks up during the timing period of relay TM2.

It is thus obvious that the arrangement of my invention provides a system whereby line circuit pulse periods having distinct timing intervals or spans may be transmitted from a control station to a remote station to actuate the movement of a single device without undue fear that induced or fault line circuit pulses resulting from natural phenomena or other causes will be effective to cause incorrect operation. The arrangement of my invention by its simplicity eliminates the possibility of trouble conditions occurring in the standard apparatus in use. At the same time, because of the arrangement of the time pulses which is required in order to effect or complete valid detection at the remote station, the operation of the valve device occurs with assurance that the action initiated is that desired by the system operator. All this is accomplished over a two-wire line circuit, which need not be a physical pair, so that the standard remote control system may be terminated at the last complete operating location and the expense of an additional station location and complicated line channel eliminated.

Although I have herein shown and described but one form of the circuit arrangement for remote function control by discrete pulse patterns embodying my invention, it is to be understood that various changes and modifications may be made therein within this scope of the appended claims without departing from the spirit and the scope of my invention.

Having thus described my invention, what I claim is:

1. A system for remotely controlling from a control station a function at a remote station between its first and second condition, comprising in combination;
    (a) a line circuit means connecting said control and remote station and having a first and a second condition, said line circuit being normally in its first condition,
    (b) a first control means at said control station for controlling said line circuit means to its second condition for a selected period of time to initiate a control transmission,
    (c) a second control means at said control station having connections for at times controlling said line circuit means to a brief period of second condition a preselected time interval after the termination of the second condition period controlled by said first means in accordance with the desired condition of said function,
    (d) a first monitor means at said remote station controlled by said line circuit means for detecting the end of the second condition period controlled by said first control means only during a first predetermined time interval after the beginning of that second condition period,
    (e) a second monitor means at said remote station controlled jointly by said line circuit means and said first monitor means for detecting said brief period of line circuit second condition only during another preselected time interval after the beginning of the first second condition period and only if said first monitor means has detected the end of that first second condition period during said first predetermined time interval,
    (f) said second monitor means having connections for operating said function to its second condition when said brief second condition period of said line circuit means is detected during the proper interval and to its first condition when only said first second condition period of said line circuit means is detected.

2. In a discrete pulse remote control system for controlling a two state function at a remote station from a local station, the combination comprising;
    (a) a line circuit means connecting said local and remote stations and operable between a first and a second condition,
    (b) control means at said local station for selecting the desired state of said function,
    (c) a first and a second timing means at said local station controlled by said control means for establishing consecutive first and second timing periods,
    (d) said line circuit means being jointly controlled by said control means and by said first timing means for transmitting a first second condition pulse during said first timing period and for restoring the first condition of said line circuit means at the end of said first timing period,
    (e) said second timing means at times controlling said line circuit means for transmitting a second pulse of second condition at the end of said second timing period when the second state of said function has been selected,
    (f) a third timing means at said remote station controlled by said line circuit means and responsive to the first pulse of second condition for establishing a third timing period spanning the end of said first timing period.
    (g) a first monitoring means controlled by said line circuit means and conditioned by said third timing means for detecting the restoration of the first condition of said line circuit means only during said third timing period,
    (h) a fourth timing means at said remote station jointly controlled by said third timing means and by said first monitoring means for establishing a fourth timing period spanning the end of said second timing period,
    (i) a second monitoring means controlled by said line circuit means and conditioned by said fourth timing means for detecting said second pulse of second condition in said line circuit only during said fourth timing period,
    (j) a function control circuit controlled jointly by said first and second monitoring means and by said fourth timing means for operating said function to a first and a second state in accordance with the selection made by said control means.

3. A discrete pulse remote control system for controlling a two state function at a remote station from a local station comprising, in combination;
    (a) a line circuit means connecting said local and remote stations and operable between a first and a second condition,
    (b) registry means at said local station for selecting the desired state of said function,
    (c) a timing means at said local station controlled by said registry means for establishing consecutive first and second pulse periods,
    (d) said line circuit means being jointly controlled by said registry means and by said timing means for transmitting a first second condition pulse during said first pulse period and for restoring the first condition of said line circuit means at the end of said first pulse period,
    (e) said timing mean sat times further controlling said line circuit means for transmitting a second pulse of second condition at the end of said second pulse period when the second state of said function has been selected,
    (f) a first timing means at said remote station controlled by said line circuit means and responsive to the first pulse of second condition, for establishing a first timing period spanning the end of said first pulse period,
    (g) a first monitoring means controlled by said line circuit means and conditioned by said first timing means for detecting the restoration of the first condition of said line circuit means only during said first timing period,
    (h) a second timing means at said remote station jointly controlled by said first timing means and by said first monitoring means for establishing a second timing period spanning the end of said second pulse period only when said first monitor means has detected the restoration of said first line condition and said first timing period has terminated, (i) a second monitoring means controlled by said line circuit means and conditioned by said second timing means for detecting said second pulse of second condition in said line circuit only during said second timing period, (j) a function control circuit controlled jointly by said first and second monitoring means and by said second timing means for operating said function to a first and a second state in accordance with the selection made by said registry means.

4. In a control system for controlling from a local station a function at a remote station between its first and second conditions, the combination comprising;

(a) a first and a second control relay at said local station, (b) control means for energizing both of said control relays when operation of said function to its second condition is desired, (c) a first and a second timing means at said local station for establishing when energized a first and a second timing period, respectively,
   (1) an energizing circuit for said first timing means including a front contact of said first control relay,
   (2) an energizing circuit for said second timing means including a back contact of said first control relay and a front contact of said second control relay, (d) holding circuits controlled by said first and second timing means for holding said first and second control relays respectively energized until the end of said first and second timing periods, respectively, (e) a line circuit means connecting said local station and said remote station,
   (1) said line circuit means being controlled by said first control relay to reflect said first timing period at said remote station,
   (2) said line circuit means being controlled by said second timing means to reflect said second timing period at said remote station,
   (3) said line circuit means being controlled by said second control relay to reflect the end of said second timing period at said remote station, (f) a third timing means at said remote station controlled by said line circuit means when it reflects said first timing period for establishing a third timing period of shorter duration than said first timing period, (g) a fourth timing means controlled by said third timing means at the end of said third timing period for establishing a fourth timing period which extends beyond the end of said first timing period, (h) a first monitor circuit means at said remote station controlled jointly by said line circuit means and said fourth timing means for detecting the end of said first timing period only during said fourth timing period, (i) a fifth timing means for establishing when energized a fifth timing period, (j) an energizing circuit for said fifth timing means controlled by said third timing means, said fourth timing means, and said monitor means and completed when said third and fourth timing periods have sequentially completed and the end of said first timing period has been detected, (k) a function control relay which when energized selects the second condition of said function, (l) a second monitor circuit having connections for energizing said function control relay when complete and including
   (1) a contact controlled by said line circuit means to be closed at the end of said second timing period,
   (2) a contact controlled by said fifth timing means and closed from the beginning of said fifth timing period,
   (3) a contact controlled by said first monitor circuit means and closed after the end of said first timing period is detected, (m) a sixth timing means controlled by said fifth timing means for establishing a sixth timing period subsequent to said fifth timing period, (n) a function control circuit including
   (1) a contact closed by said first monitor circuit means when the end of said first timing period is detected,
   (2) a contact closed by said fifth timing means at the end of said fifth timing period,
   (3) a contact opened by said sixth timing means at the end of said sixth timing period,
   (4) a contact controlled by said function control relay.

5. In a control system for controlling from a local station a function at a remote station between its first and second conditions, the combination comprising;

(a) a first and a second control relay at said local station, (b) control means for energizing said first control relay or both control relays in accordance with the function operation desired, (c) a first and a second timing means at said local station for establishing when energized a first and a second timing period, respectively,
   (1) an energizing circuit for said first timing means including a front contact of said first control relay,
   (2) an energizing circuit for said second timing means including a back contact of said first control relay and a front contact of said second control relay, (d) holding circuits controlled by said first and second timing means for holding said first and second control relays respectively energized until the end of said first and second timing periods, respectively, (e) a line circuit means connecting said local station and said remote station,
   (1) said line circuit means being controlled by said first control relay to reflect said first timing period at said remote station,
   (2) said line circuit means being controlled by said second timing means to reflect said second timing period at said remote station,
   (3) said line circuit means being controlled by said second control relay to reflect the end of said second timing period at said remote station, (f) a third timing means at said remote station controlled by said line circuit means when it reflects said first timing period for establishing a third timing period of shorter duration than said first timing period, (g) a fourth timing means controlled by said third timing means at the end of said third timing period for establishing a fourth timing period which extends beyond the end of said first timing period, (h) a first monitor means at said remote station jointly controlled by said line circuit means and said fourth timing means for detecting the end of said first timing period only during said fourth timing period, (i) a fifth timing means for establishing when energized a fifth timing period, (j) an energizing circuit for said fifth timing means controlled by said third timing means, said fourth timing means, and said first monitor means and completed when said third and fourth timing periods have sequentially completed and the end of said first timing period has been detected, (k) a function control relay for selecting the desired condition of said function as that relay is energized or remains deenergized,
(l) a second monitor circuit having connections for energizing said function control relay when complete and including
    (1) a contact closed by said line circuit means at the end of said second timing period,
    (2) a contact closed by said fifth timing means from the beginning of said fifth timing period,
    (3) a contact closed by said first monitor means after the end of said first timing period is detected,
(m) a function control circuit including
    (1) a contact closed by said first monitor means when the end of said first timing period is detected,
    (2) a contact closed by said fifth timing means at the end of said fifth timing period,
    (3) a contact controlled by said function control relay for selecting the first or second condition of said function.

References Cited by the Examiner

UNITED STATES PATENTS

| | | | |
|---|---|---|---|
| 2,197,130 | 4/1940 | Lewis | 340—167 |
| 2,273,231 | 2/1942 | Snavely et al. | 340—163 |
| 2,273,477 | 2/1942 | Thompson et al. | 340—167 |
| 2,421,022 | 5/1947 | Francis | 340—167 |
| 2,534,746 | 12/1950 | Wells | 340—167 |

NEIL C. READ, *Primary Examiner.*

L. A. HOFFMAN, A. H. WARING, *Assistant Examiners.*